(12) United States Patent
Moseke

(10) Patent No.: US 11,845,348 B2
(45) Date of Patent: Dec. 19, 2023

(54) CHARGING PLUG FOR A MOTOR VEHICLE, AND LOAD CONTACT MODULE FOR A CHARGING PLUG

(71) Applicant: PHOENIX CONTACT E-MOBILITY GMBH, Moenchengladbach (DE)

(72) Inventor: Dirk Moseke, Hoexter-Luechtringen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 330 days.

(21) Appl. No.: 16/606,883

(22) PCT Filed: Apr. 10, 2018

(86) PCT No.: PCT/EP2018/059181
§ 371 (c)(1),
(2) Date: Oct. 21, 2019

(87) PCT Pub. No.: WO2018/192805
PCT Pub. Date: Oct. 25, 2018

(65) Prior Publication Data
US 2020/0079235 A1    Mar. 12, 2020

(30) Foreign Application Priority Data

Apr. 21, 2017    (DE) .................... 10 2017 108 526.2

(51) Int. Cl.
*B60L 53/16*       (2019.01)
*H01R 13/66*       (2006.01)
(Continued)

(52) U.S. Cl.
CPC ............... *B60L 53/16* (2019.02); *B60L 50/60* (2019.02); *H01R 13/6683* (2013.01); *B60L 53/302* (2019.02)

(58) Field of Classification Search
CPC ...... B60L 53/16; B60L 50/60; H01R 13/6683
(Continued)

(56) References Cited

U.S. PATENT DOCUMENTS 9,705,259 B2    7/2017   Feldner
9,821,671 B2    11/2017  Mueller et al.
(Continued)

FOREIGN PATENT DOCUMENTS

CN    106099548    11/2016
DE    102013110548    3/2015
(Continued)

OTHER PUBLICATIONS

English translation of International Search Report from corresponding PCT Appln. No. PCT/EP2018/059181, dated Jul. 13, 2018.
(Continued)

*Primary Examiner* — Suchin Parihar
(74) *Attorney, Agent, or Firm* — Grossman, Tucker, Perreault & Pfleger, PLLC

(57) ABSTRACT

A charging plug for a motor vehicle, having a connection module and a load contact module, the connection module being connectable to supply lines for supplying power, the load contact module having a load contact for transmitting charging power, and the load contact module being detachably and replaceably secured to the connection module, the load contact module including a temperature sensor.

20 Claims, 5 Drawing Sheets

(51) Int. Cl.
*B60L 50/60* (2019.01)
*B60L 53/302* (2019.01)

(58) Field of Classification Search
USPC .......................................................... 320/107
See application file for complete search history.

(56) References Cited

U.S. PATENT DOCUMENTS

| | | | |
|---|---|---|---|
| 10,439,336 B2 | 10/2019 | Fuehrer et al. | |
| 2002/0081486 A1* | 6/2002 | Williams | H01M 10/46 |
| | | | 429/100 |
| 2016/0039297 A1* | 2/2016 | Kretschmer | G01K 13/00 |
| | | | 439/620.21 |
| 2016/0138980 A1* | 5/2016 | Jefferies | G01K 7/24 |
| | | | 374/141 |
| 2017/0062993 A1* | 3/2017 | Sumner | H01R 13/6683 |
| 2017/0237205 A1* | 8/2017 | Fuehrer | B60L 3/0023 |
| | | | 439/620.22 |
| 2018/0097316 A1 | 4/2018 | Rose et al. | |
| 2018/0201142 A1* | 7/2018 | Galin | B60L 53/57 |
| 2018/0229615 A1* | 8/2018 | Shumaker | H01R 13/6683 |
| 2019/0036278 A1* | 1/2019 | Shimizu | H01R 4/72 |
| 2020/0080901 A1* | 3/2020 | Myer | G01K 5/72 |
| 2020/0406770 A1* | 12/2020 | Ruppert | H02J 7/0042 |
| 2021/0008992 A1* | 1/2021 | Liu | B60L 53/16 |

FOREIGN PATENT DOCUMENTS

| | | |
|---|---|---|
| DE | 102013110798 | 4/2015 |
| DE | 102015203842 | 9/2015 |
| DE | 102014111185 | 2/2016 |
| DE | 102015106251 | 10/2016 |
| EP | 2942840 | 11/2015 |
| WO | 2015/084106 | 6/2015 |

OTHER PUBLICATIONS

English translation of International Preliminary Report on Patentability from corresponding PCT Appln. No. PCT/EP2018/059181, dated Oct. 22, 2019.

\* cited by examiner

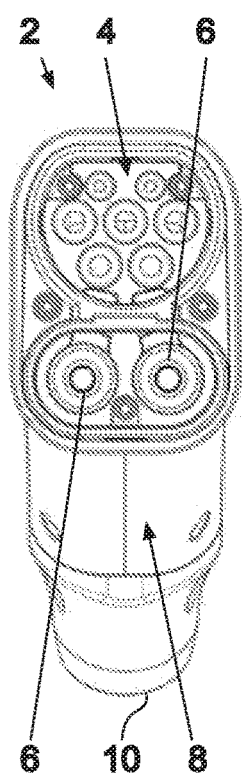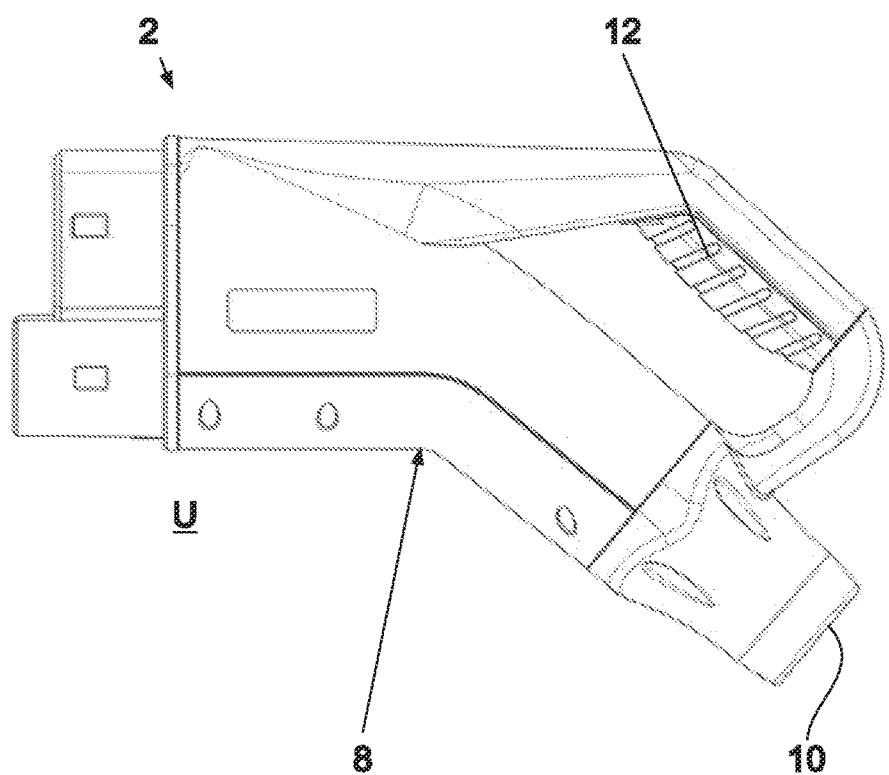
Fig. 1
Fig. 2
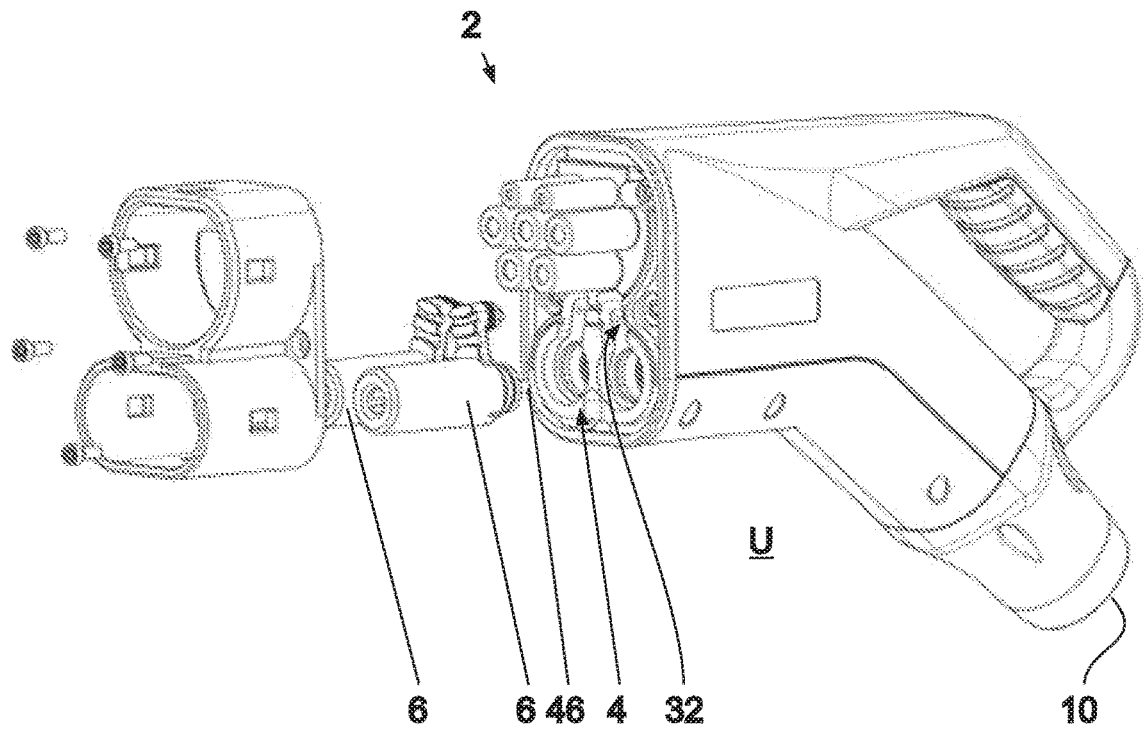
Fig. 3

CHARGING PLUG FOR A MOTOR VEHICLE, AND LOAD CONTACT MODULE FOR A CHARGING PLUG

FIELD

The present invention relates to a charging plug for a motor vehicle.

BACKGROUND

A charging plug for a motor vehicle is used to couple electric or hybrid vehicles to a charging station for charging their battery. For charging a vehicle, the charging plug that is connected to a charging station is plugged into a corresponding charging socket of the vehicle. These types of charging plugs and charging sockets, i.e., in particular the connection geometry and line cross sections of the plug-in connection, are standardized.

There is a continual demand for further increasing the possible charging power that is transmittable via these standardized connections. High levels of charging power may result in damage to a charging plug or a charging socket due to overheating in the area of the plug-in connection.

To protect charging plugs from overheating, active cooling systems are known that cool the charging plug. Here as well, however, it cannot be ruled out that a charging plug, in particular in the area of the load contacts, overheats and is damaged during the transmission of high levels of charging power.

In light of this background, the technical object underlying the invention is to provide a charging plug for a motor vehicle and a load contact module for a charging plug which do not have, at least to an appreciable extent, the above-described disadvantages, and in particular provide protection from damage during the transmission of high levels of charging power.

SUMMARY

According to a first aspect, the invention relates to a charging plug for a motor vehicle, having a connection module and a load contact module, the connection module being connectable to supply lines for supplying power, the load contact module having a load contact for transmitting charging power, and the load contact module being detachably and replaceably secured to the connection module. The load contact module has a temperature sensor.

During a charging operation, the temperature in the area of the load contact module may be measured by means of the temperature sensor. If overheating of the charging plug is present or imminent, the charging operation may be aborted or temporarily interrupted. For example, the charging operation may be aborted or interrupted as soon as a predefined threshold temperature is reached or exceeded. Damage to the charging plug and/or a socket connected to the charging plug may be avoided in this way.

The temperature sensor is configured to measure the temperature in the area of the load contact module. In particular, the temperature sensor is configured to measure the temperature of the load contact. The temperature of the load contact may thus be monitored with the temperature sensor.

The temperature sensor may be connected to the load contact via a material having high heat conductivity. In particular, the temperature sensor may be connected to the load contact via a metal component.

A temperature of the load contact may be measured by the temperature sensor before and/or during and/or after a charging operation and relayed to a controller of a charging station.

As a result of the temperature sensor being part of the load contact module, the temperature sensor may be easily replaced together with the load contact, which is subject to wear, by replacing the load contact module. It may thus be ensured that reliable temperature monitoring always takes place using a functional temperature sensor. If a load contact of the charging plug is to be replaced, for example after overheating of the charging plug or based on maintenance specifications, the temperature sensor is also replaced at the same time.

The charging plug may have two or more load contact modules. Each load contact module may have a temperature sensor, in particular a single temperature sensor. A load contact module may have two or more temperature sensors in order to provide redundancy.

The connection module may rest in a charging plug housing or be accommodated in an inner space of the charging plug housing. The charging plug housing may be made, at least partially, of a plastic. The charging plug housing may have a handle for handling of the charging plug by an operator. The charging plug housing may have a connection opening for feeding lines into an inner space of the charging plug housing.

According to another embodiment of the charging plug, it is provided that the temperature sensor is enclosed, at least in sections, by a housing of the load contact module. The temperature sensor may thus be protected from damage. In particular, the temperature sensor may be completely surrounded by the housing or accommodated in an inner space of the housing.

The temperature sensor may be an integral part of the load contact module.

The temperature sensor may in particular be integrated into the load contact module in one piece, i.e., not detachably, nondestructively integrated into the load contact module.

According to another embodiment of the charging plug, it is provided that the load contact has an opening for receiving a contact pin, the temperature sensor being situated at a distance from the opening. The temperature sensor may thus be incorporated into an existing design of a charging plug without changing the contact area between a load contact and a contact pin.

The load contact may, for example, have an essentially sleeve-like shape and may have an essentially circular cylindrical, axially extended opening for receiving a contact pin. The temperature sensor is situated at a radial distance from the axially extended circular cylindrical opening.

It may be provided that the load contact is accommodated in an axially extended housing section of a housing of the load contact module, and the temperature sensor is accommodated in a radially extended housing section of a housing of the load contact module that protrudes from the axially extended housing section. The temperature sensor may thus be compactly integrated into the load contact module.

According to another embodiment of the charging plug, it is provided that the temperature sensor rests on a circuit board, the circuit board having a contact element for connecting the temperature sensor to the connection module. The circuit board may have a mounting for positioning the temperature sensor in the housing. The circuit board may be used for conducting heat from the load contact to the temperature sensor, wherein the circuit board may be directly connected to the load contact or indirectly connected to the load contact, for example via an intermediate element such as a spring or the like.

It may be provided that the temperature sensor and/or the circuit board are/is covered by a casting compound, the casting compound delimiting the temperature sensor and/or the circuit board from the surroundings. Thus, for example, it may be provided that the casting compound closes off or seals an opening in a housing of the load contact module in order to completely encapsulate the temperature sensor and/or the circuit board and protect them/it from environmental influences.

The temperature sensor may be coupleable to a measuring device and/or control device via the contact element and the connection module.

The temperature sensor may have a resistance thermometer and/or a thermocouple. A temperature in the area of the load contact module may thus be cost-effectively and reliably detected.

It may be provided that the contact element is a plug-in connector, which with one or more contacts rests in one or more complementarily shaped receptacles of the connection module. Rapid replacement of the load contact module may thus be made possible.

The contact element and/or the circuit board may be braceably situated against the connection module in an elastic manner. Reliable contacting with the connection module may thus be achieved.

According to another embodiment of the charging plug, it is provided that the circuit board is connected to the load contact via a leaf spring. Cost-effective and reliable elastic bracing, in particular between the contact element and the connection module, may thus be achieved. Two or more springs, in particular two or more leaf springs, may be provided to connect the circuit board to the load contact module.

The leaf spring may be held on the circuit board via one or more spring arms that engage(s) with one or more receptacles of the circuit board. A radial distance between a receptacle and the temperature sensor may be 5 mm or greater.

It may be provided that the contact element has two or more contacts, in particular exactly two contacts, that are designed as axially protruding profiles. The profiles may in particular rest in complementarily shaped recesses of the connection module. The profiles together with the recesses may be used to guide the load contact module on the connection module with correct alignment during installation of the load contact module. Three or more contacts, which are designed in particular as axially protruding profiles, may be provided.

According to another embodiment of the charging plug, it is provided that the load contact module, in particular the load contact, is secured to the connection module via a screw connection. Reliable and cost-effective detachable securing of the load contact module to the connection module may be achieved in this way.

It may be provided that a cooling device for cooling the charging plug is provided in a charging plug housing in which the connection module rests, the temperature sensor being situated at a distance from the cooling device. As a result of the temperature sensor being part of the load contact module and being situated at a distance from the active cooling device, there is no, or at least less, skewing of the measured value of the temperature sensor by the cooling device. Thus, for an actively cooled charging plug, in particular the temperature of the load contact of the load contact module may be reliably detected.

The load contact module may have at least two seals, each resting against the connection module, for sealing off an inner space of the charging plug with respect to the surroundings. A first seal may be associated with the load contact or be mounted on the load contact. A second seal may be associated with a housing section or be mounted on a housing section that surrounds the contact element. The seals may each be designed as a circumferential seal. At least one seal may be an O-ring.

According to a second aspect, the invention relates to a load contact module for a charging plug, having a load contact for transmitting charging power, the load contact module being detachably and replaceably connectable to a connection module of the charging plug. The load contact module has a temperature sensor. The load contact module may be connectable to a charging plug for an electric vehicle in the manner described above.

The load contact module may have the above-described features with regard to the charging plug according to the invention.

The temperature sensor of the load contact module may be enclosed, at least in sections, by a housing of the load contact module.

The load contact of the load contact module may have an opening for receiving a contact pin, the temperature sensor being situated at a distance from the opening, in particular at a radial distance from the opening.

The load contact of the load contact module may be accommodated in an axially extended housing section, and the temperature sensor may be accommodated in a radially extended housing section that protrudes from the axially extended housing section.

The temperature sensor of the load contact module may rest on a circuit board, the circuit board having a contact element for connecting the temperature sensor to the connection module.

It may be provided that the temperature sensor and/or the circuit board are/is covered by a casting compound, the casting compound delimiting the temperature sensor and/or the circuit board with respect to the surroundings. Thus, for example, it may be provided that the casting compound closes off or seals an opening in a housing of the load contact module in order to completely encapsulate the temperature sensor and/or the circuit board and protect them/it from environmental influences.

The contact element of the load contact module may be a plug-in connector which with one or more contacts is insertable into one or more complementarily shaped receptacles of the connection module.

The contact element and/or the circuit board of the load contact module may be braceably situated against the connection module in an elastic manner.

The circuit board of the load contact module may be connected to the load contact via a leaf spring. Two or more springs, in particular two or more leaf springs, may be provided to connect the circuit board to the load contact module.

The leaf spring may be held on the circuit board via one or more spring arms that engage(s) with one or more receptacles of the circuit board. A radial distance between a receptacle and the temperature sensor may be 5 mm or greater. The contact element of the load contact module may have two contacts that are designed as axially protruding profiles. Three or more contacts may be provided which in particular are designed as axially protruding profiles.

The load contact module, in particular the load contact, may be securable to the connection module via a screw connection.

The temperature sensor of the load contact module, in an installed state on the connection module, may be situated at a distance from an active cooling device that is provided in a charging plug housing in which the connection module rests. In particular, the temperature sensor, in an installed state on the connection module, may be situated at an axial distance from the active cooling device.

BRIEF DESCRIPTION OF THE DRAWINGS

The invention is described in greater detail below, based on the drawings which illustrate one exemplary embodiment. The drawings schematically show the following:

FIG. 1 shows a charging plug according to the invention in a front view;

FIG. 2 shows the charging plug from FIG. 1 in a side view;

FIG. 3 shows an exploded illustration of the charging plug from FIG. 1 in a perspective view;

DETAILED DESCRIPTION

Figure 4:
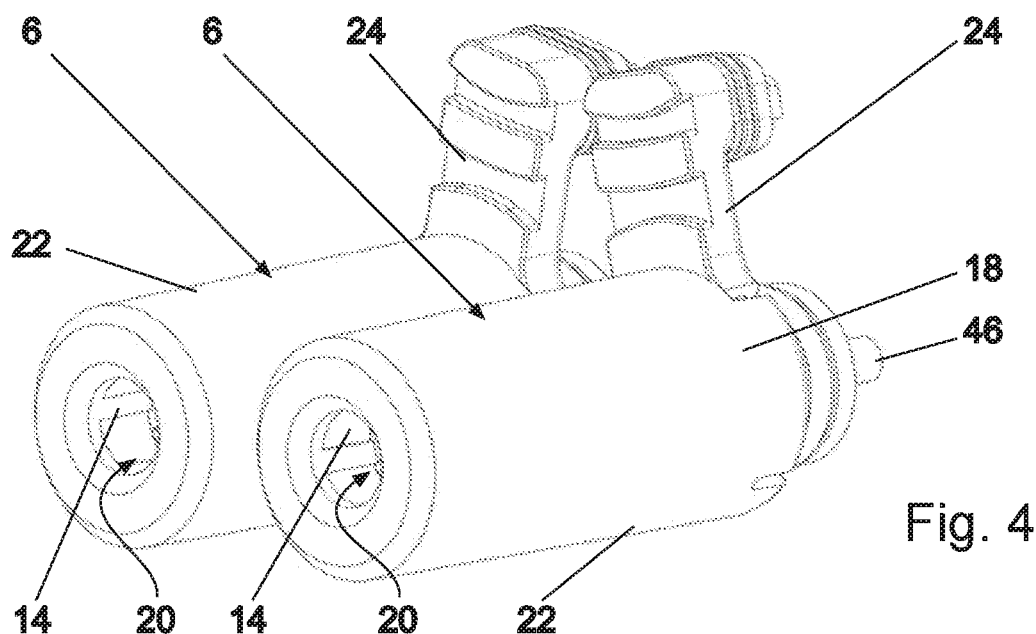
FIG. 4 shows a load contact module of the charging plug according to the invention from FIG. 1 in a perspective view.

FIGS. 1, 2, and 3 show a charging plug 2 according to the invention for a motor vehicle (not illustrated). The charging plug 2 has a connection module 4 and two load contact modules 6 according to the invention. The connection module 4 is connectable to supply lines (not illustrated) for supplying power. Such supply lines may be connected, for example, to a public or private charging station that is configured for charging a battery of an electric vehicle or a hybrid vehicle.

The charging plug 2 has a charging plug housing 8 with a connection opening 10. The connection opening 10 is provided for feeding lines or power supply lines into an inner space of the charging plug housing 8. In the present case, the charging plug housing 8 is made up of two half-shells made of a plastic. The charging plug housing 8 has a handle 12 that is provided for handling of the charging plug 2 by an operator.

The two load contact modules 6 according to the invention (FIG. 4) have the same structural features, so that the structural design of one of the load contact modules 6 is described in detail below (FIGS. 5 through 10).

The load contact module 6 has a load contact 14 for transmitting charging power from a charging station to a battery of a motor vehicle. The load contact module 6 is detachably and replaceably secured to the connection module 4.

The load contact module 6 has a temperature sensor 16. The temperature sensor 16 is enclosed, at least in sections, by a housing 18 of the load contact module 6. The load contact 14 is likewise accommodated in the housing 18.

The load contact 14 has an opening 20 for receiving a contact pin (not illustrated). Such a contact pin is provided, for example, at a charging socket of a motor vehicle that has a shape complementary with the charging plug 2. The temperature sensor 16 is situated at a radial distance R1 from the opening 20. In the present case, a radial direction r extends transversely with respect to an axial direction a along the axis A.

The load contact 14 has an essentially sleeve-like shape, and the opening extended along the axis A has an essentially circular cylindrical shape. During a charging operation, a contact pin of a charging socket associated with the opening 20 protrudes into the opening 20, with a circumferential surface of the pin resting against the load contact 14.

The temperature sensor 16 is situated at a radial distance R2 from the essentially circular cylindrical opening 20.

The load contact 14 is accommodated in an axially extended housing section 22 of the housing 18. The temperature sensor 16 is accommodated in a radially extended housing section 24 of the housing 18 that protrudes from the axially extended housing section 22.

Figure 5:
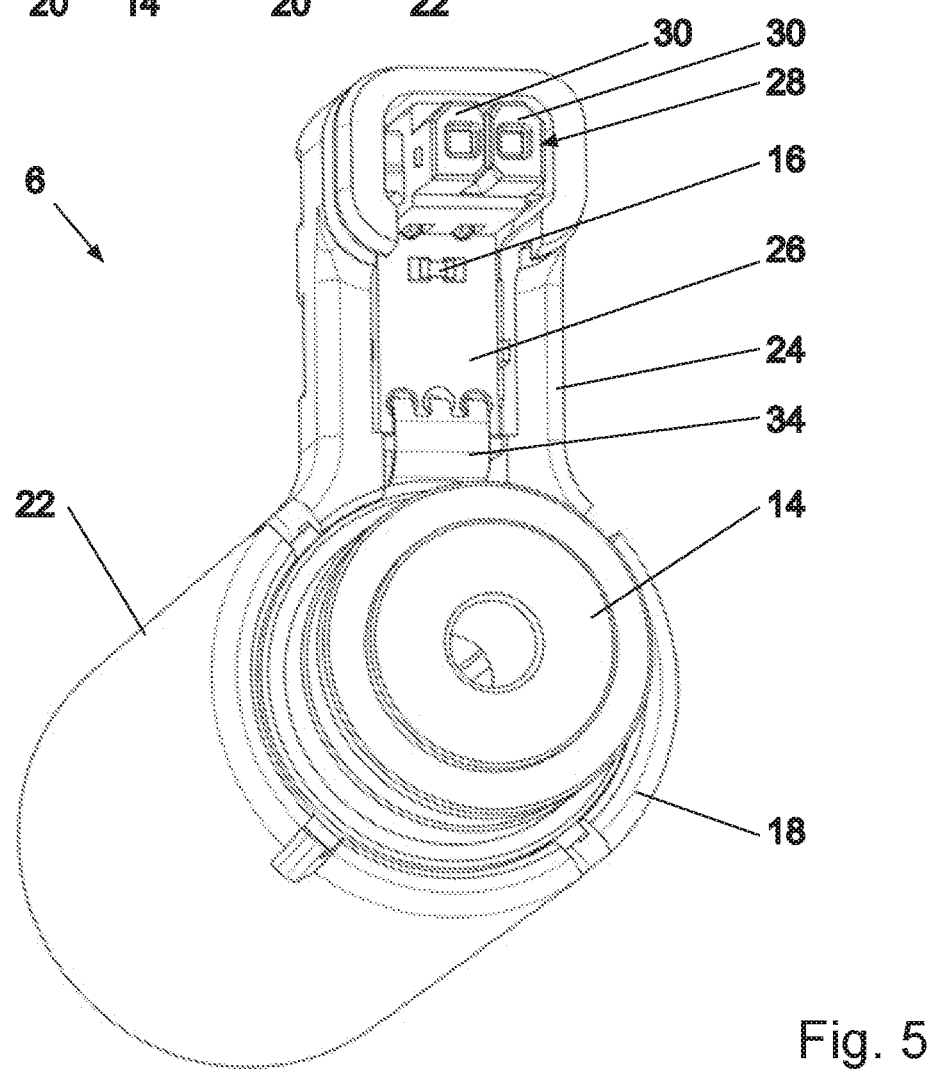
FIG. 5 shows a load contact module in a perspective view.
Figure 6:
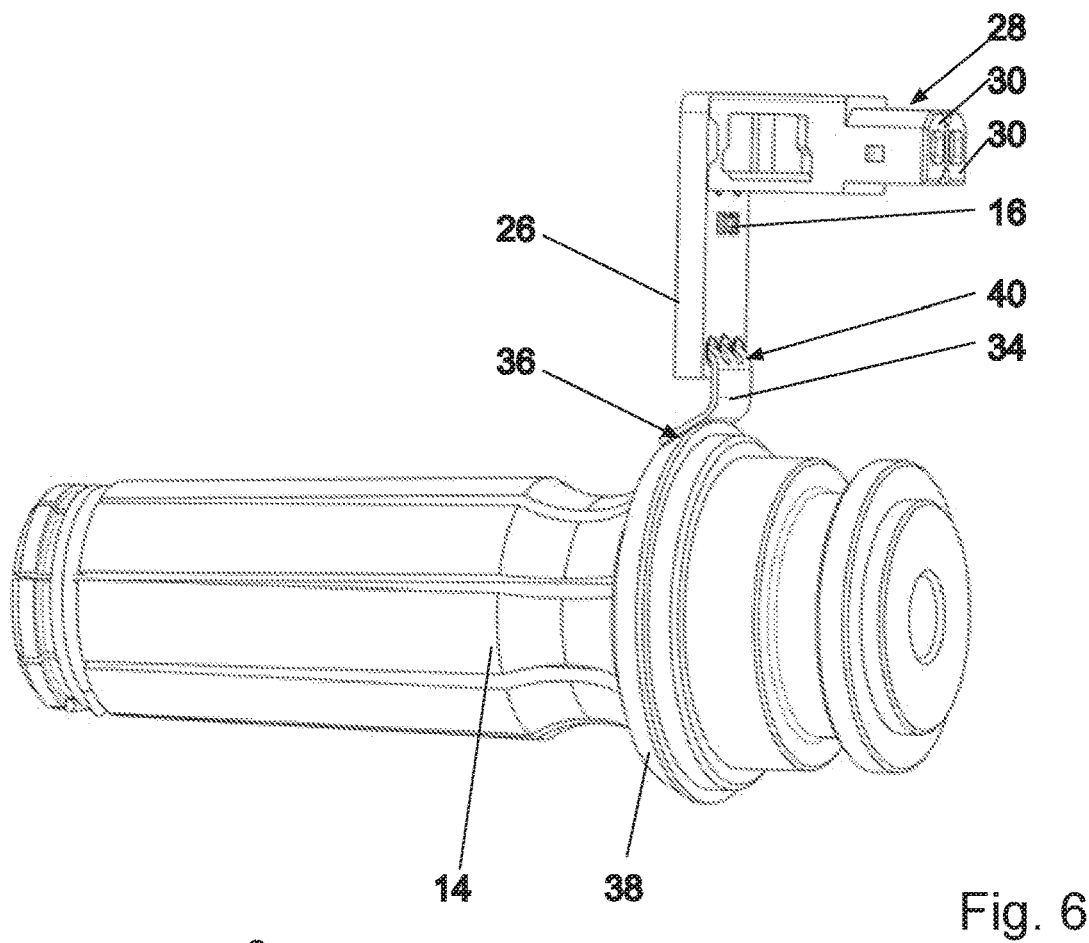
FIG. 6 shows the load contact module from FIG. 5 without the housing.

As is apparent from FIGS. 5 and 6, the temperature sensor 16 rests on a circuit board 26. The load contact module 6 is illustrated without the housing 18 in FIG. 6.

The circuit board 18 [sic; 26] has a contact element 28 that is configured for connecting the temperature sensor 16 to the connection module 4.

In the present case, the contact element 28 is a plug-in connector, which with two contacts 30 rests in two complementarily shaped receptacles 32 of the connection module 4.

The circuit board 26 is connected to the load contact 14 via a leaf spring 34. The leaf spring 34 with a section 36 is connected to a circular circumferential shoulder 38 of the load contact 14. The leaf spring 34 is connected to the circuit board 26 via a section 40. Provided on the section 40 of the leaf spring 34 are three separate retaining arms 42 that engage with receptacles 44 of the circuit board 26.

Figure 7:
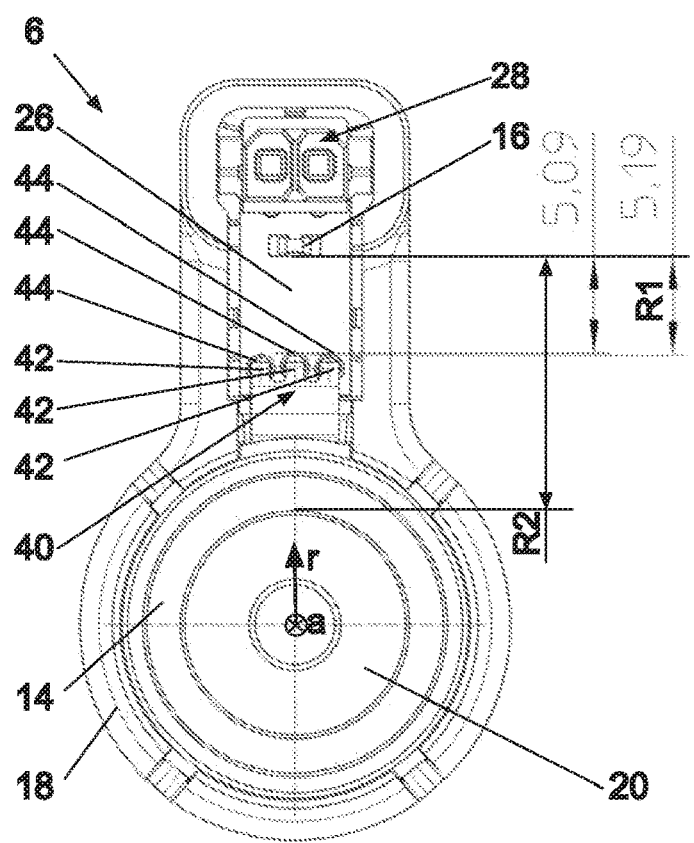
FIG. 7 shows the load contact module from FIG. 5 in a rear view.

As is apparent from FIG. 7, the radial distance R1 between the receptacles 44 and the temperature sensor 16 is at least 5 mm.

The contact element 28 is braced against the connection module 4 in an elastic manner by means of the leaf spring 34. In particular, the contact element 28 with its contacts 30 rests in the respective associated receptacles 32 with elastic bracing.

In the present case, the contacts 30 of the contact element 28 are designed as axially protruding profiles.

Figure 8:
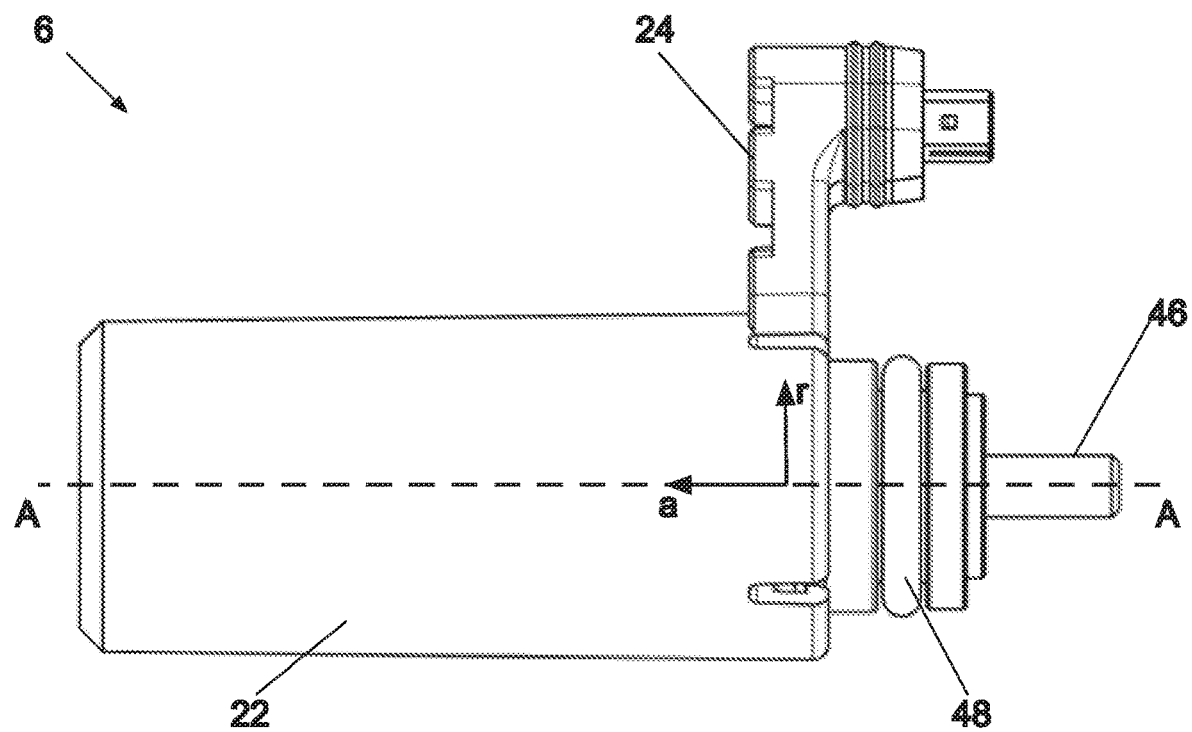
FIG. 8 shows the load contact module from FIG. 5 in a side view.
Figure 9:
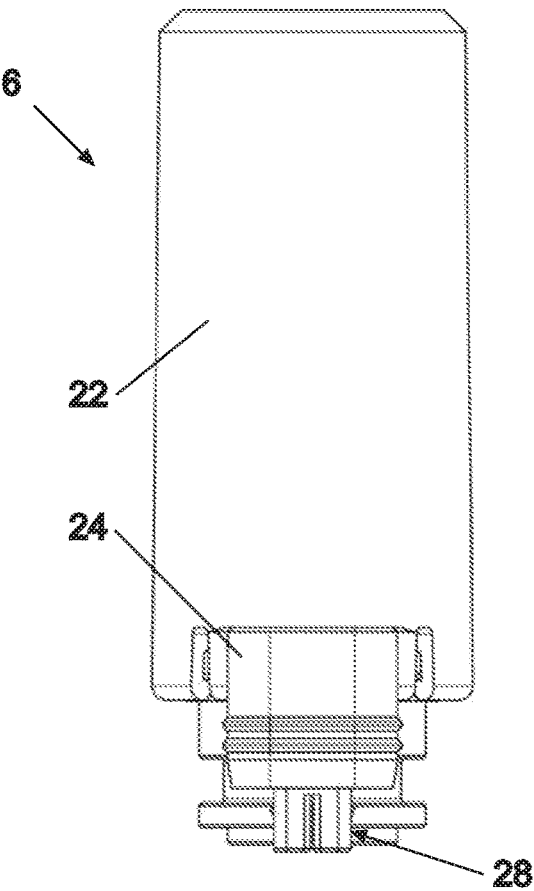
FIG. 9 shows the load contact module from FIG. 5 in a top view.

The load contact module 6 is secured to the connection module 4 via a screw connection. A cylinder head screw 46 is thus introduced through the opening 20 and into the load contact module 6, as indicated in FIGS. 3, 4, and 8, for example.

In the present case, an active cooling device for cooling the charging plug is provided in the charging plug housing 8 in which the connection module 4 rests, the temperature sensor 16 being situated at an axial distance from the active cooling device.

A sealing ring 48 (by way of example in FIG. 8) is used in the area of the connection of the load contact module 6 to the connection module 4 to seal off the charging plug with respect to the surroundings.

Figure 10:
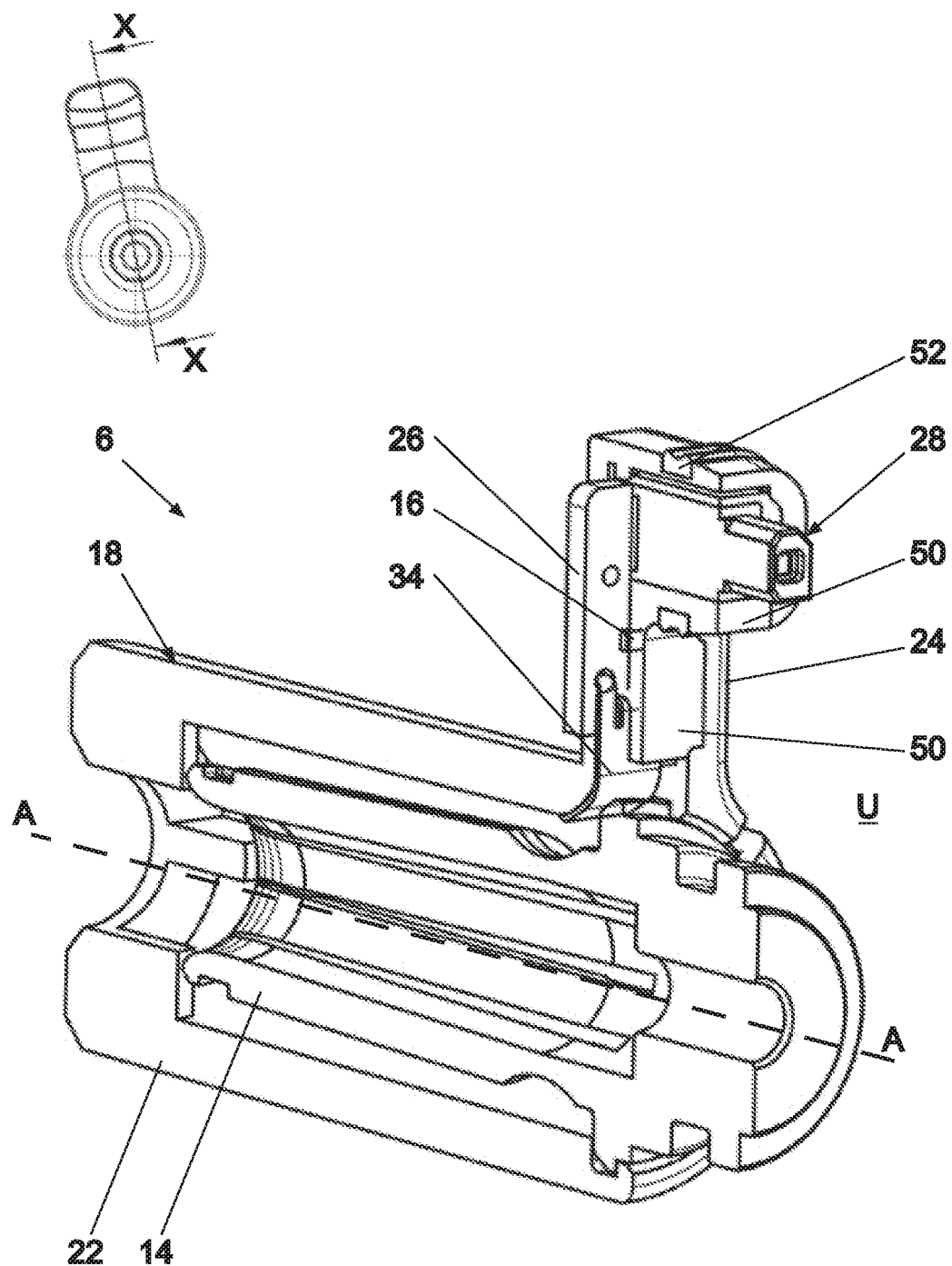
FIG. 10 shows the load contact module from FIG. 5 in a sectional illustration.

As is apparent from the partial section in FIG. 10, the temperature sensor 16 and the circuit board 26 are completely surrounded by the housing 18 and a casting compound 50, and are thus integrated into an inner space of the housing 18. The housing 18 is hereby closed off by the casting compound 50 to protect the temperature sensor 16 and the circuit board 26 from environmental influences.

In addition to a sealing ring 48, shown in FIG. 8, a circumferential sealing ring 52 may be provided to seal off the charging plug 2, in particular an inner space of the charging plug 2, with respect to the surroundings.

Accordingly, the load contact module may have at least two seals 48, 52, each resting against the connection module 4, to seal off an inner space of the charging plug 2 with respect to the surroundings U.

LIST OF REFERENCE SYMBOLS 2 charging plug
4 connection module
6 load contact module
8 charging plug housing
10 connection opening
12 handle
14 load contact
16 temperature sensor
18 housing of the load contact module 6
20 opening
22 axially extended housing section 22 of the housing 18
24 radially extended housing section 24 of the housing 18
26 circuit board
28 contact element
30 contact
32 receptacle
34 leaf spring
36 section of the leaf spring 34
38 shoulder of the load contact 14
40 section of the leaf spring 34
42 retaining arms of the leaf spring 34
44 receptacle of the circuit board 26
46 cylinder head screw
48 sealing ring
50 casting compound
52 seal
a axial direction a
A axis
r radial direction
R1 distance
R2 distance
U surroundings

What is claimed is:

1. A charging plug for a motor vehicle, comprising:
a connection module; and
a load contact module;
wherein the connection module is connectable to supply lines for supplying power,
wherein the load contact module has a load contact for transmitting charging power,
wherein the load contact module is detachably and replaceably secured to the connection module,
wherein the load contact module has a temperature sensor,
wherein the load contact is accommodated in an axially extended housing section,
wherein the temperature sensor is accommodated in a radially extended housing section that protrudes from the axially extended housing section,
wherein the temperature sensor rests on a circuit board, and
wherein the circuit board has a contact element for connecting the temperature sensor to the connection module.

2. The charging plug according to claim 1, wherein:
the temperature sensor is enclosed, at least in sections, by a housing of the load contact module.

3. The charging plug according to claim 1, wherein:
the load contact has an opening for receiving a contact pin,
wherein the temperature sensor is situated at a distance from the opening.

4. The charging plug according to claim 1, wherein:
the contact element is a plug-in connector, which with one or more contacts rests in one or more complementarily shaped receptacles of the connection module.

5. The charging plug according to claim 1, wherein:
the contact element and/or the circuit board are/is braceably situated against the connection module in an elastic manner.

6. The charging plug according to claim 1, wherein:
the circuit board is connected to the load contact via a leaf spring.

7. The charging plug according to claim 1, wherein:
the contact element has two contacts that are designed as axially protruding profiles.

8. The charging plug according to claim 1, wherein:
the load contact module, in particular the load contact, is secured to the connection module via a screw connection;
and/or
an active cooling device for cooling the charging plug is provided in a charging plug housing in which the connection module rests, the temperature sensor being situated at a distance from the active cooling device.

9. A load contact module for a charging plug comprising:
a load contact for transmitting charging power,
wherein the load contact module is detachably and replaceably connectable to a connection module of the charging plug, comprising a temperature sensor,
wherein the load contact is accommodated in an axially extended housing section, and
wherein the temperature sensor is accommodated in a radially extended housing section that protrudes from the axially extended housing section.

10. A charging plug for a motor vehicle, comprising:
a connection module; and
a load contact module;
wherein the connection module is connectable to supply lines for supplying power,
wherein the load contact module has a load contact for transmitting charging power,
wherein the load contact module is detachably and replaceably secured to the connection module,
wherein the load contact module has a temperature sensor,
wherein the load contact module has a housing having an axial extended housing section and a radial extended housing section that protrudes from the axial extended housing section,
wherein the load contact is accommodated in the axially extended housing section, and wherein the temperature sensor is accommodated in the radially extended housing section that protrudes from the axially extended housing section.

11. The charging plug according to claim 1, wherein:
the load contact module housing provides the axial and radial extended housing sections as a single piece.

12. The charging plug according to claim 1, wherein:
the load contact module housing is disposed within an overlying housing of the charging plug.

13. The charging plug according to claim 10, wherein:
the temperature sensor is enclosed, at least in sections, by the load contact module housing.

14. The charging plug according to claim 10, wherein:
the load contact has an opening for receiving a contact pin,
wherein the temperature sensor is situated at a distance from the opening.

15. The charging plug according to claim 10, wherein:
the contact element is a plug-in connector, which with one or more contacts rests in one or more complementarily shaped receptacles of the connection module.

16. The charging plug according to claim 10, wherein:
the contact element and/or the circuit board are/is braceably situated against the connection module in an elastic manner.

17. The charging plug according to claim 10, wherein:
the circuit board is connected to the load contact via a leaf spring.

18. The charging plug according to claim 10, wherein:
the contact element has two contacts that are designed as axially protruding profiles.

19. The charging plug according to claim 10, wherein:
the load contact module, in particular the load contact, is secured to the connection module via a screw connection;
and/or
an active cooling device for cooling the charging plug is provided in a charging plug housing in which the connection module rests, the temperature sensor being situated at a distance from the active cooling device.

20. The charging plug according to claim 10, wherein:
the temperature sensor rests on a circuit board, and
wherein the circuit board has a contact element for connecting the temperature sensor to the connection module.

* * * * *